(12) United States Patent
Lähteenmäki et al.

(10) Patent No.: US 6,600,033 B1
(45) Date of Patent: Jul. 29, 2003

(54) MODIFIED CELLULOSE ETHERS

(75) Inventors: Mikko Lähteenmäki, Parantala (FI);
Heidi Känköhen, Äänekoski (FI);
Göran Kloow, Elst (Gld) (NL); Oliver Ruppert, Äänekoski (FI); Jennifer Ann Leupin, Cincinnati, OH (US); Eugene Paul Gosselink, Cincinnati, OH (US)

(73) Assignee: Metsa Specialty Chemicals Oy, Aanekoski (FI)

( * ) Notice: Subject to any disclaimer, the term of this patent is extended or adjusted under 35 U.S.C. 154(b) by 0 days.

(21) Appl. No.: 09/463,499

(22) PCT Filed: Apr. 8, 1999

(86) PCT No.: PCT/FI99/00296
§ 371 (c)(1),
(2), (4) Date: Jun. 19, 2000

(87) PCT Pub. No.: WO99/61479
PCT Pub. Date: Dec. 2, 1999

(30) Foreign Application Priority Data

May 25, 1998 (FI) .................................................. 981149

(51) Int. Cl.$^7$ .......................... C08B 11/00; C08B 31/08; C08B 11/193; C08B 11/02; C07H 15/04
(52) U.S. Cl. ............................ 536/43; 536/50; 536/84; 536/90; 536/99; 536/111; 536/120; 536/123.1; 536/123.12
(58) Field of Search .............................. 536/43, 50, 84, 536/90, 99, 111, 120, 123.1, 123.12

(56) References Cited

U.S. PATENT DOCUMENTS

| 2,627,477 A | 2/1953 | Downey ..................... 106/170 |
| 3,931,069 A | 1/1976 | Lindin ..................... 260/17 R |
| 5,017,268 A | 5/1991 | Clitherow et al. .......... 162/146 |

*Primary Examiner*—Jezia Riley
(74) *Attorney, Agent, or Firm*—Millen, White, Zelano & Branigan, P.C.

(57) ABSTRACT

The invention relates to a cellulose ether that is hydrophobically modified with an alkyl or alkenylketene dimer of general formula (I), in which $R_1$ and $R_2$ are alkyl or alkenyl chain,

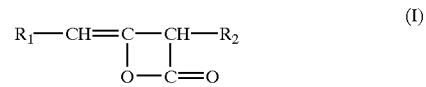

such as one having 5 to 22, preferably 13 to 20, most preferably 14 to 18 carbons. The product can be used in water-based products to control the rheological properties, for example. Objects of use include, for example, detergents, paper coating mixtures, paints, dispersing agents, and oil drilling muds.

23 Claims, No Drawings

MODIFIED CELLULOSE ETHERS

BACKGROUND OF THE INVENTION

The invention relates to hydrophobically modified cellulose ethers and to the use thereof.

Cellulose ethers, such as carboxymethyl cellulose, are employed in a wide variety of applications to treat the rheological properties of aqueous solutions in particular. Objects of use include, for example, foods, medicines, cosmetic preparations, detergents, agricultural chemicals, textiles, printing inks, paper coating agents, construction materials, adhesives, paints, ceramic materials, and additives of polymerisation.

Cellulose ethers can be modified by attaching different substituents to hydroxyl groups in cellulose. In this way, the solubility or the hydrophobicity of cellulose ether in particular can be affected.

There is a lot of literature concerning the hydrophobic modification of polysaccharides.

U.S. Pat. No. 4,228,277 describes the modification of non-ionic cellulose ethers, such as methyl cellulose, methyl hydroxypropyl cellulose, hydroxypropyl cellulose, and particularly hydroxyethyl cellulose, by using epoxyalkanes having a length of the alkyl group of 10 to 24 carbons. According to the patent, one advantage of the modification is that even small amounts of hydrophobically modified cellulose ether make the viscosity of an aqueous solution increase so that the dosage of the cellulose ether can be decreased. The cellulose ether thus modified can be used in paints. The modification is carried out by using a cellulose ether as a starting material, and the reaction times are long, 2 to 5 hours. However, it is uncomfortable to use epoxy compounds because they are detrimental to health.

In FI Patent No. 95138, carboxymethyl hydroxyethyl cellulose is modified by an alkyl group having 8 to 25 carbons in an amount of 0.1 to 4% by weight. This product is also applied to paints. The alkyl reagent can be halide, halohydride, or epoxide, all of which are hazardous to environment and health. Hydroxyethylation, hydrophobic modification, and carboxymethylation are carried out in sequence, therefore the reaction time is long, more than 4 hours.

U.S. Pat. No. 5,302,196 describes cellulose ethers which are modified by a fluorine-containing alkyl group having 3 to 24 carbon atoms, the fluorine content being 0.05 to 5% by weight. The cellulose ether is especially hydroxyethyl cellulose, hydroxyethyl carboxymethyl cellulose or methyl hydroxyethyl cellulose. The fluorine-containing alkyl reagent is preferably epoxide, bromide or perfluoroolefin. This product is also developed for paints. The reaction is long, the modification requires a reaction time of 6 hours.

In EP Patent Application No. 384167, cellulose ether, especially hydroxyethyl cellulose, is modified with an aromatic alkyl group having at least 10 carbons, the content being 0.001 to 0.1 moles per one mole of a glucose repeat unit of the cellulose ether. The alkyl reagent can be, for example, halide, oxirane, acid, (thio)isocyanate or halohydrin. The product can be used in latex paints. This manufacturing process also has a long reaction time, 6 or up to 12 hours.

GENERAL DESCRIPTION OF THE INVENTION

According to the independent claim 1, hydrophobically modified cellulose ethers have been invented. The dependent claims disclose some preferred embodiments of the invention.

This invention introduces a new type of hydrophobically modified cellulose ether in which the modifying agent is alkylketene dimer. The cellulose ether is preferably carboxymethyl cellulose or sodium carboxymethyl cellulose (CMC, NaCMC).

Cellulose ether modified with alkylketene dimer is easy to manufacture. The process is safe, simple, and quick. The modification can also improve the dispersability of cellulose ether in water.

The product is suitable to be used in any water-based application. The hydrophobic group renders the substance properties that are advantageous to, for example, detergents, paper coating mixtures, paints, dispersing agents, and oil drilling muds.

DETAILED DESCRIPTION OF THE INVENTION

According to the invention, alkylketene dimer (AKD) is used to modify the cellulose ether. The general formula of AKD is

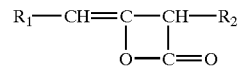

in which $R_1$ and $R_2$ are alklyl or alkenyl chains having 5 to 22, preferably 13 to 20 carbons. $R_1$ or $R_2$ can also be substituted or they can contain heteroatoms in a chain. $R_1$ or $R_2$ can in particular have a straight chain and contain 14 to 18 carbons.

AKD reacts with the hydroxyl group of cellulose or cellulose ether, forming the following formula:

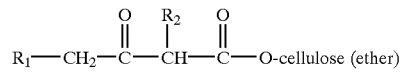

Elevated temperatures, such as 30–120° C., preferably 50–90° C., and most preferably 60–85° C., enhance the reaction, so that at the elevated temperatures AKD is melted first. High temperature and alkaline pH improve the reactivity of AKD with cellulose ether. AKD can react with the substituent, for example carboxymethyl group in cellulose ether. AKD can also react with other compounds which contain an OH group. These include water, alcohol, and sodium glycolate which are generated in the preparation of CMC. The thus generated compounds also have an effect on the hydrophobicity of the product.

The reacted AKD concentration in the cellulose ether can be analysed by using gas chromatography. The unreacted AKD or AKD reacted with other OH containing compounds are extracted with a suitable solvent. The sample is hydrolysed causing the cleavage of alkyl ketene group. The reacted AKD is extracted with a suitable solvent and analysed with gas chromatograph.

The AKD can be in a solid state or dispersed in water or other solvents.

The content of AKD in the cellulose ether can be 0.001–10% by weight. The content is preferably 0.01–2% by weight.

The molecular weight (Mw) of the cellulose ether can be 10 000–1 000 000, preferably 20 000–700 000. The cellulose ether can be, for example, alkyl, hydroxyalkyl or carboxyalkyl substituted or a mixed ether of these.

According to the invention, cellulose ether that is modified by AKD can be used in any water-based application. It can be used, for example, in paper or board coating mixtures, in the wet end in paper or board manufacturing, paints, construction materials, adhesives, oil drilling mud, detergents, cosmetic products, and as a dispersion agent.

The cellulose ether is preferably carboxymethyl cellulose (CMC). Its degree of substitution (DS, i.e., the average number of substituted hydroxyl groups in a glucose ring) can be for example, 0.2–2.0, preferably 0.4–1.5, most preferably 0.4–1.2. Its molecular weight is preferably 40 000–500 000. It can be applied to all the above-mentioned objects.

The cellulose ether can also be, e.g., hydroxyethyl cellulose (HEC). Its molecular weight can be, for example, 90 000–1 300 000 and the molar substitution (MS) 1.5–4. HEC can be used in coating, construction materials, and cosmetic preparations in particular.

The cellulose ether can also be, e.g., hydroxypropyl cellulose (HPC). Its molecular weight can be, for example, 80 000–1 150 000 and the molar substitution (MS) 1.5–4. HPC can be used in foods, medical preparations, and coating in particular.

There is a lot of literature about the manufacture of cellulose ethers. Generally, cellulose ethers are prepared by mixing wood-based or cotton wool-based raw material with a reaction medium, such as alcohol or acetone, and by mercerising it with an alkalic substance, such as sodium hydroxide, to activate the cellulose. An etherifying chemical is added and it is allowed to react. The complete product is neutralised. The viscosity can be reduced if needed. By-products, such as salts generated in the reaction, are washed out with alcohol, for example, when purified cellulose ether is manufactured, but they can also be left in the product or only remove partly (technical or crude cellulose ether). The solvent used is separated and the product is dried. The particle size and the bulk density can be adjusted by grinding the product into powder or by granulating it. The product can also be screened.

Cellulose ether can be modified with AKD by various methods. AKD can be added to the cellulose ether at any stage of the production, for example, in mercerisation, etherification, or drying. AKD can be added in a solid form or as a dispersion. High temperature and alkaline pH improve the reactivity of AKD with cellulose ether.

AKD can also be added to the cellulose ether as such. The cellulose ether can be coated, for example, with solid AKD or an AKD dispersion. In that case, a suitable amount of AKD is sprayed onto the surface of the cellulose ether or mixed with it. The product is treated with high temperature to initiate the reaction.

The manufacture of the hydrophobically modified cellulose ether according to the invention is simple and quick. Neither complex solvents nor long reaction times are needed. In addition, AKD is a safe chemical. It is neither combustible nor explosive; therefore, it neither causes a danger in a process nor is it dangerous to the environment. AKD is not hazardous or irritating and it does not cause allergies; therefore, it does not present any danger to the process personnel or the end-user.

The hydrophobically modified cellulose ether is especially useful in detergent compositions. The cellulose ether is preferably carboxymethyl cellulose (CMC). Its degree of substitution is most preferably 0.4–0.6. The compositions generally comprise about 0.1–5% by weight of cellulosic based fabric treatment components, preferably 0.5–4%, most preferably 0.75–3%. The detergent composition can be in liquid, paste or granular form. The compositions comprise about 1–80% by weight, preferably 5–50% of detersive surfactants which can be of the anionic, nonionic, zwitterionic, ampholytic or cationic type. The compositions may also comprise about 0.1–80% by weight of a detergent builder, preferably 1–10% in liquid form and 1–50% in granular form. Detergent builders can comprise, for example, phosphate salts as well as various organic and inorganic nonphosphorus builders. In addition to the surfactants, builders and cellulosic based materials, the detergent compositions can also include for example enzymes and enzyme stabilizing agents, suds boosters or suds suppressors, anti-tarnish and anticorrosion agents, soil suspending agents, soil release agents, germicides, pH adjusting agents, non-builder alkalinity sources, chelating agents, organic and inorganic fillers, solvents, hydrotropes, optical brighteners, dyes and perfumes.

Granular detergent compositions are generally made by combining base ingredients as a slurry and spray drying the resulting slurry to a low level of residual moisture. The remaining ingredients can be admixed as dry or in case of liquid form, sprayed onto the resulting granules. Liquid detergent compositions can be prepared by admixing the ingredients in any desired order.

Laundering of fabrics and textiles in washing solutions containing hydrophobically modified cellulose ether, followed by rinsing and drying, imparts fabric appearance benefits to the fabric and textile articles so treated. Such benefits can include improved overall appearance, pill/fuzz reduction, antifading, improved abrasion resistance, and/or enhanced softness.

EXAMPLES

All examples employed alkylketene dimer, the length of the alkyl group being 16 to 18 carbons (Raisio Chemicals).

Example 1

100 g of CMC (Metsa Speciality Chemicals) having an average molecular weight of 180 000 and a degree of substitution of 0.65 was put into a steel container. 1 g of alkylketene dimer dispersion having an AKD content of 10% by weight, diluted with 50 g of water, was sprayed on CMC, agitating the powder at the same time. The product was dried at 80° C. to a moisture content of less than 8%. The AKD content of the end product was 0.1% by weight.

Examples 2–6

By using the procedure described above, the following hydrophobically modified CMC samples (examples 2–6) were prepared:

TABLE 1

| Example | Molecular weight of CMC | Degree of substitution of CMC | AKD content in CMC, % by weight |
| --- | --- | --- | --- |
| 2 | 60000 | 0.72 | 0.05 |
| 3 | 300000 | 0.80 | 0.05 |
| 4 | 220000 | 0.87 | 0.1 |
| 5 | 305000 | 1.15 | 1.0 |
| 6 | 80000 | 0.75 | 0.01 |

Sample 5 contained 0.02% by weight of AKD which had reacted with CMC.

Example 7

100 g of CMC having an average molecular weight of 40 000 and a degree of substitution of 0.79 was put into a steel cylinder. 5 g of solid alkylketene dimer was added. The powder was agitated in an oven at 60° C. for 120 minutes and at 105° C. for 15 min. The AKD content of the end product was 5.0% by weight.

Example 8

Hydrophobically modified CMC having an average molecular weight of 400 000 and a degree of substitution of 0.86, and an AKD content of 10.0% by weight, was prepared according to the procedure described in example 7.

Example 9

47 g of wood pulp (Metsä-Botnia), 175 g of ethanol, and 20 g of water were mixed together in a closed glass flask which was provided with a mixer and a nitrogen atmosphere as an option. The flask was placed in a water bath. 18 g of sodium hydroxide, diluted with 18 g of water, was added and the cellulose was mercerised for 30 minutes at 20° C. 22 g of monochloracetic acid, diluted with 6 g of water, and 1.25 g of alkylketene dimer dispersion having an AKD content of 20% by weight were added and the temperature was raised in 55 minutes to 65° C. The cellulose was etherified for 60 minutes at 65° C. Ethanol was recovered and the product was dried at 80° C. to a moisture content of less than 8%. The AKD content of the end product was 0.3% by weight, the average molecular weight 150 000, and the DS of the carboxymethyl group 0.57. The sample contained 0.02% by weight of AKD reacted with cellulose.

Examples 10–15

Samples 10–15 were prepared according to the procedure described in example 9. In example 10 and 15 the product was neutralised after etherification with hydrochloric acid. In example 10 AKD was added after neutralisation and allowed to react 5 minutes at 70° C.

TABLE 2

| Example | Molecular weight of CMC | Degree of substitution of CMC | AKD content in CMC, % by weight |
|---|---|---|---|
| 10 | 180000 | 0.46 | 0.6 |
| 11 | 120000 | 0.48 | 0.6 |
| 12 | 140000 | 0.52 | 0.06 |
| 13 | 150000 | 0.55 | 1.1 |
| 14 | 140000 | 0.56 | 2.7 |
| 15 | 270000 | 0.52 | 0.06 |

Sample 12 contained <0.01% by weight of AKD which had reacted with CMC.

Example 16

100 g of wood pulp (Metsä-Botnia), 1270 g of isopropanol, and 162 g of water were mixed together in a closed glass flask which was provided with a mixer and a nitrogen atmosphere. The flask was placed in a water bath. 40 g of sodium hydroxide, diluted with 40 g of water, was added and the cellulose was mercerised for 90 minutes at 20° C. 44 g of monochloracetic acid, diluted with 11 g of water, and 1 g of alkylketene dimer dispersion having an AKD content of 10% by weight were added, and the temperature was raised in 45 minutes to 70° C. The cellulose was etherified for 90 minutes at 70° C. CMC was neutralised with hydrochloric acid. The byproducts of the reaction, sodium chloride and sodium glycolate, were washed out with 75% methanol, and the product was dried at 80° C. to a moisture content of less than 8%. The AKD content of the end product was 0.08%, the average molecular weight 270 000, and the DS of the carboxymethyl group 0.59.

Examples 17–19

Samples 17–19 were prepared according to the procedure described in example 16. In example 19 AKD was added during mercerisation.

TABLE 3

| Example | Raw material | Molecular weight of CMC | Degree of substitution of CMC | AKD content in CMC, % by weight |
|---|---|---|---|---|
| 17 | wood pulp (Metsa-Botnia) | 60000 | 0.77 | 0.07 |
| 18 | wood pulp (Borregaard) | 240000 | 0.89 | 0.07 |
| 19 | cotton linter (Buckeye, Temming) | 380000 | 0.80 | 0.7 |

Example 20

A granular detergent composition in accordance with the invention has the following basic formula:

TABLE 4

| Component | Wt. % |
|---|---|
| $C_{12}$ Linear alkyl benzene sulfonate | 9.31 |
| $C_{14-15}$ alkyl ether (0.35 EO) sulfate | 12.74 |
| Zeolite Builder | 27.79 |
| Sodium Carbonate | 27.31 |
| PEG 4000 | 1.60 |
| Dispersant | 2.26 |
| $C_{12-13}$ Alcohol Ethoxylate (9 EO) | 1.5 |
| Sodium Perborate | 1.03 |
| Soil Release Polymer | 0.41 |
| Enzymes | 0.59 |
| Hydrophobically modified cellulose ether | 3.0 |
| Perfume, Brightener, Suds Suppressor, Other Minors, Moisture, Sulfate | Balance |
| | 100% |

What is claimed is:
1. A hydrophobically modified cellulose ether, wherein the hydrophobic modification has been carried out by using an alkyl or alkenylketene dimer the formula of which is

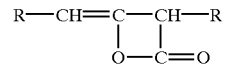

wherein R is an alkyl or alkenyl group.
2. A modified cellulose ether according to claim 1, wherein the alkyl or alkenyl chain has 5 to 22 carbons.
3. A modified cellulose ether according to claim 2, wherein the alkyl or alkenyl chain has 13 to 22 carbons.
4. A modified cellulose ether according to claim 1, wherein the alkyl or alkenyl chain has 14 to 18 carbons.
5. A modified cellulose ether according to claim 1, of the formula,

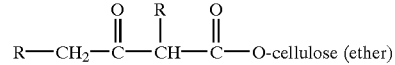

wherein R is an alkyl or alkenyl group.
6. A modified cellulose ether according to claim 1, wherein the molecular weight of the cellulose ether is 10 000–1,000 000.
7. A modified cellulose ether according to claim 6, wherein the molecular weight of the, cellulose ether is 20 000–700 000.

8. A modified cellulose ether according to claim 7, wherein the molecular weight of the cellulose ether is 40 000–500 000.

9. A modified cellulose ether according to claim 5, wherein the modified cellulose ether consists of 0.001–10% by weight of the alkyl or alkenylketene dimer group.

10. A modified cellulose ether according to claim 9, wherein the modified cellulose ether consists of 0.01–2% by weight of the alkyl or alkenylketene dimer group.

11. A modified cellulose ether according to claim 1, wherein the cellulose ether is carboxymethyl cellulose.

12. A modified cellulose ether according to claim 11, wherein the carboxymethyl cellulose has a degree of substitution of 0.2–2.

13. A modified cellulose ether according to claim 12, wherein the carboxymethyl cellulose has a degree of substitution of 0.4–1.5.

14. A modified cellulose ether according to claim 13, wherein the carboxymethyl cellulose has a degree of substitution of 0.4–1.2.

15. A detergent composition comprising a hydrophobically modified cellulose ether according to claim 1.

16. A detergent composition according to claim 15, mixed with water or an aqueous composition.

17. A detergent composition according to claim 15, wherein the hydrophobically modified cellulose ether is hydrophobically modified carboxymethyl cellulose.

18. A detergent composition according to claim 17, wherein the hydrophobically modified carboxymethyl cellulose has a degree of substitution of 0.4–0.6

19. A hydrophobically modified cellulose ether, obtained by reacting an alkyl or alkenylketene dimer of the formula

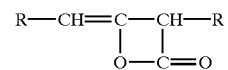

with a cellulose ether,
wherein R is an alkyl or alkenyl group.

20. A modified cellulose ether of the formula,

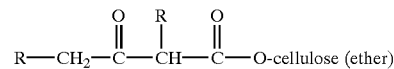

wherein R is an alkyl or alkenyl group.

21. A modified cellulose ether according to claim 1, wherein the cellulose ether is sodium carboxymethyl cellulose.

22. A modified cellulose ether according to claim 1, wherein the cellulose ether is hydroxyethyl cellulose.

23. A modified cellulose ether according to claim 1, wherein the cellulose ether is hydroxypropyl cellulose.

* * * * *

UNITED STATES PATENT AND TRADEMARK OFFICE
CERTIFICATE OF CORRECTION

PATENT NO. : 6,600,033 B1
DATED : July 29, 2003
INVENTOR(S) : Mikko Lahteenmaki et al.

It is certified that error appears in the above-identified patent and that said Letters Patent is hereby corrected as shown below:

Title page,
Item [75], Inventors, reads "Kanköhen," should read -- Kahkönen, --

Column 6,
Line 64, reads "1,000 000." should read -- 1 000 000. --

Signed and Sealed this

Tenth Day of August, 2004

JON W. DUDAS
*Acting Director of the United States Patent and Trademark Office*